United States Patent
Nordström

[19]

[11] Patent Number: 5,957,266
[45] Date of Patent: Sep. 28, 1999

[54] FEEDER

[75] Inventor: Gunnar Nordström, Nynäshamn, Sweden

[73] Assignee: Saxlund & Company, Vasterhaninge, Sweden

[21] Appl. No.: 08/875,735
[22] PCT Filed: Feb. 13, 1996
[86] PCT No.: PCT/SE96/00179
  § 371 Date: Aug. 4, 1997
  § 102(e) Date: Aug. 4, 1997
[87] PCT Pub. No.: WO96/25351
  PCT Pub. Date: Aug. 22, 1996

[30] Foreign Application Priority Data

Feb. 14, 1995 [SE] Sweden .................................. 9500524

[51] Int. Cl.⁶ .................................................. B65G 25/04
[52] U.S. Cl. ........................... 198/747; 198/741; 414/156
[58] Field of Search .................................. 198/736, 737, 198/738, 741, 743, 744, 747, 468.11; 414/156, 176, 198

[56] References Cited

U.S. PATENT DOCUMENTS

| 3,890,889 | 6/1975 | Fishburne | 198/743 X |
| 4,157,761 | 6/1979 | Debor | 198/747 |
| 5,733,116 | 3/1998 | Tanno et al. | 414/156 X |

FOREIGN PATENT DOCUMENTS

| 0 317 142 | 5/1989 | European Pat. Off. | B65G 65/44 |
| 1 751 850 | 12/1970 | Germany | F23K 3/00 |
| 183 781 | 5/1963 | Sweden | B65G 65/44 |
| 416 634 | 1/1981 | Sweden | B65G 65/44 |

Primary Examiner—James R. Bidwell
Attorney, Agent, or Firm—Kilpatrick Stockton LLP

[57] ABSTRACT

The present invention relates to an apparatus for feeding solid fuels in a space limited by a plane bottom plate, side walls and a pusher device arranged adjacent the bottom surface. A drive is located outside the walls and is attached to the pusher in order to obtain a reciprocating movement of the pusher. The invention is characterized in that the pusher comprises a number of pusher rods arranged substantially parallel with each other and substantially parallel with the bottom surface.

8 Claims, 4 Drawing Sheets

FEEDER

TECHNICAL AREA

The present invention relates to an apparatus for feeding of solid fuels according to the preamble of patent claim 1.

STATE OF THE ART

There are a number of different apparatuses on the market, such as piston and push rod feeders, for feeding of solid fuels such as wood chips, bark, coal and peat to combustion plants as well as sludge, slurry, sand etc. in different process plants. Push rod feeders are often arranged as a frame placed on the bottom of a rectangular space. The frame obtains a reciprocal movement by means of hydraulic cylinders placed outside the space and attached to rectangular, horizontally arranged plates attached to the frame, which plates move through openings in a wall of the space. Above the space, a silo or the like is often arranged for storage of the fuel, with a passage between the silo and the space so that the space is continually filled with material. In the frame, and transversal to the direction of movement, feeder means are arranged, which means have a substantially wedge like appearance so that material is pushed in front of the wedges when the frame is moved in one direction and that the wedges so to say slide under the material when the frame is moved in the other direction. This design is well suited for feeding heavy and damp solid fuel material such as wood chips and bark.

If the feeder apparatus is placed close to the burner, it has to be assured that no air can enter from the rear into the space. If air is allowed to enter into the space, there is a great risk that the fuel is ignited in the feeding apparatus, which is very dangerous.

Because the above described design with plates at the end of the frame is very difficult to seal off around the passages in the back wall of the space, it has been necessary to enclose the space behind the feeding apparatus, where the hydraulic cylinders are placed, in order to prevent air from entering that way, when it is placed close to the combustion area. The enclosure has in turn led to reduced serviceability as well as reduced access to repairs.

In order to solve the problem with sealing, circular rods were introduced between the frame and the hydraulic cylinders. Sealing between the rods and the back wall is substantially simplified due to the circular rods, because ordinary packing boxes can be used. The need for enclosing the hydraulic cylinders have thereby been omitted.

This design works very well with respect to sealing and for a variety of solid fuels. However, there are problems occurring with build-up of certain materials, such as damp wood chips and bark, against the back wall because the frame has a tendency of bringing some material with it during its return movement, so that the material is packed so much that the frame eventually is prevented from moving, with operation shut down as a consequence. In order to try to remedy this problem, the back wall has been designed with a rounded part so that the material can slide up along the curving and be mixed with the material coming from above. In practice, this has not proved very successful; the material is still packing with operation shutdowns as a consequence.

BRIEF DESCRIPTION OF THE INVENTION

The aim of the invention is to remedy the above mentioned problems. This is accomplished by an apparatus for feeding of solid matter such as wood chips, bark and the like in a space, limited by a substantially plane bottom plate forming a bottom surface, side walls arranged around the bottom surface, forming limiting surfaces, and an opening in said space, the lower edge of said opening being substantially in the same plane as said bottom surface, pusher means, arranged adjacent to said bottom surface, which pusher means extend through the limiting surface opposite said opening, and drive means arranged outside said limiting surfaces and attached to said pusher means in order to obtain a reciprocating movement of said pusher means in a direction towards and from said opening, characterised in that said pusher means are arranged substantially parallel with each other and parallel with said bottom surface.

SHORT DESCRIPTION OF THE DRAWINGS

The apparatus according to the present invention will be described in detail in connection with a few preferred embodiments and referring to attached drawings, of which FIG. 1 shows a view from above and partially in cross-section of an embodiment of a feeding apparatus according to the present invention, FIG. 2 shows a side view in cross-section along the line II—II of FIG. 1, FIG. 3 shows, in a view similar of FIG. 1, another embodiment of the apparatus according to the invention, and FIG. 4 shows a view similar to the view of FIG. 2 taken along the line IV—IV of the embodiment according to FIG. 3.

DESCRIPTION OF PREFERRED EMBODIMENTS

Figure 1:
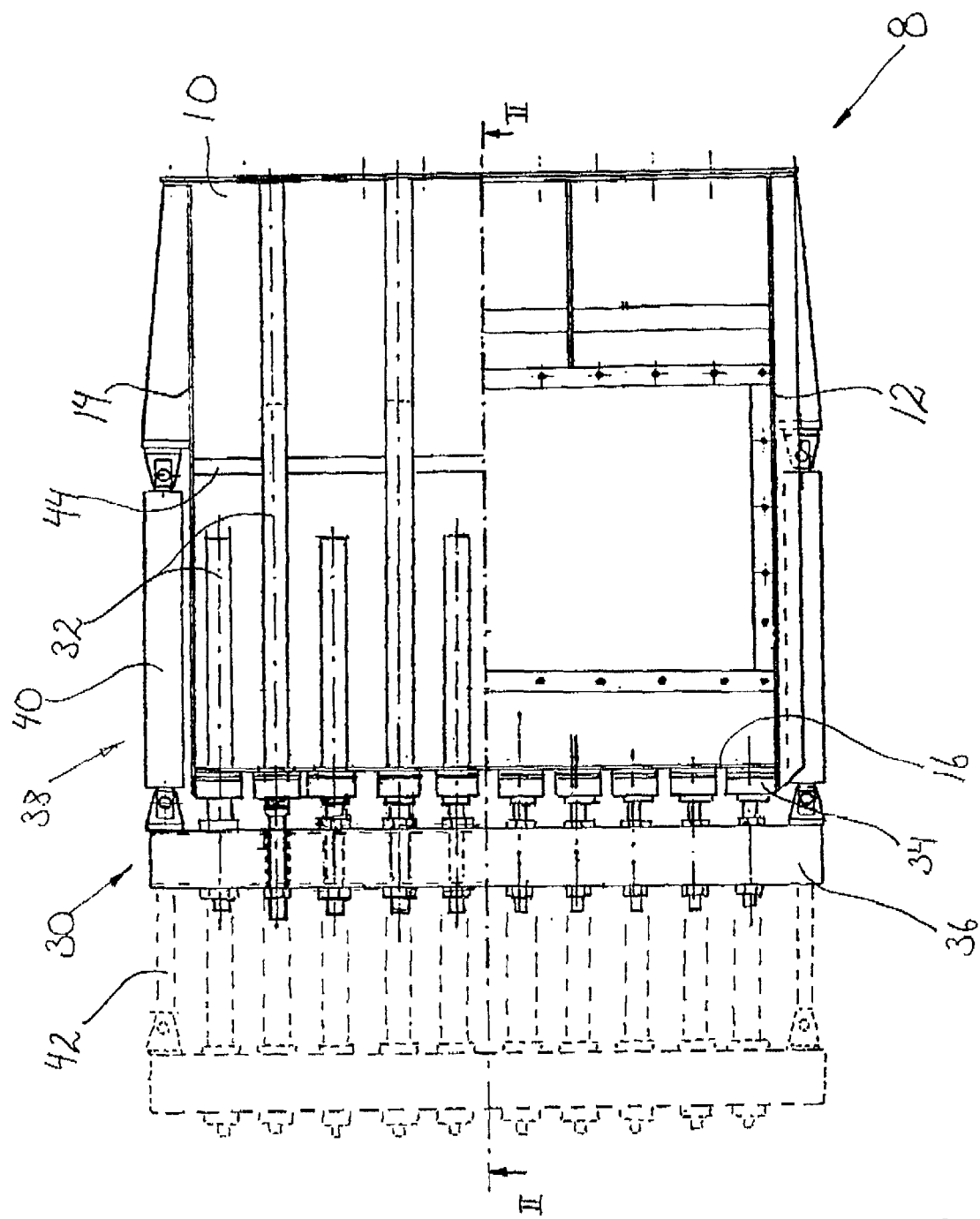
Figure 2:
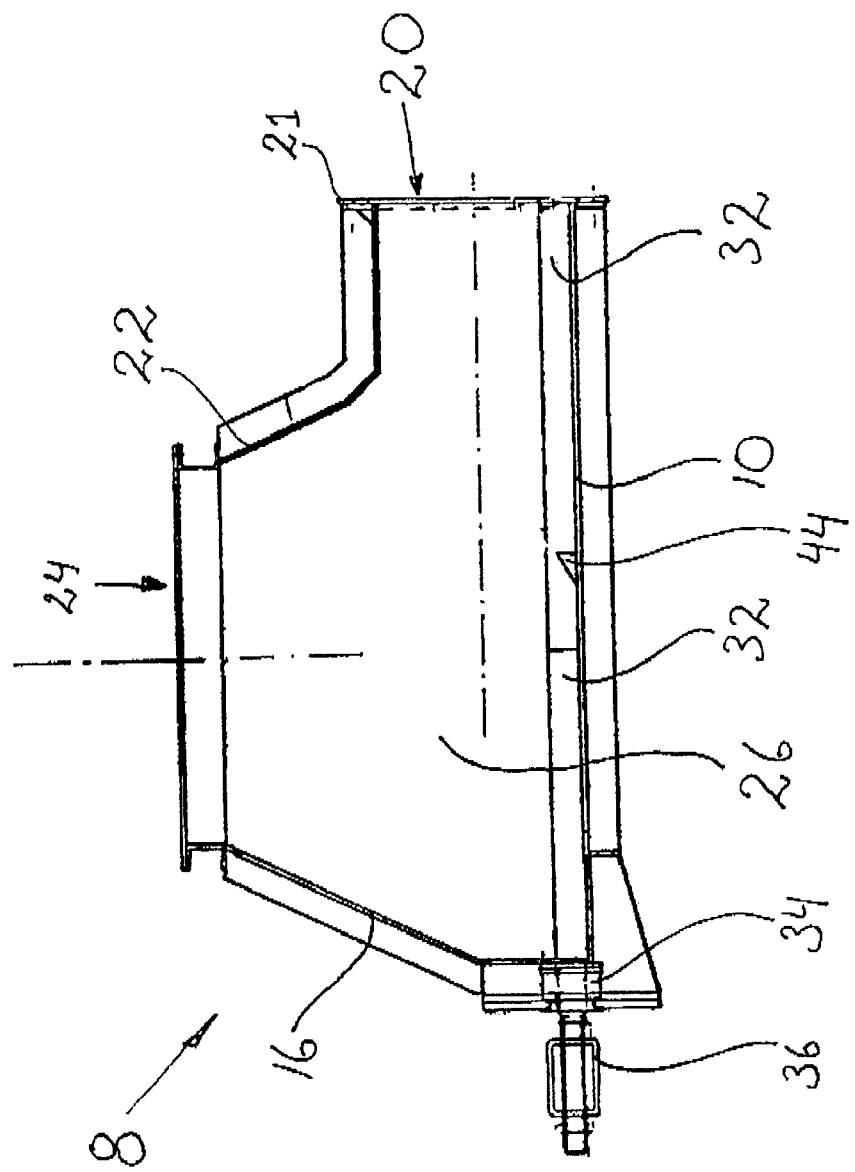

The apparatus according to the present invention will be described below with a few preferred embodiments. One embodiment is shown in FIGS. 1 and 2. The feeding apparatus 8 comprises a substantially plane bottom plate 10 forming a bottom surface 10'. Two side walls 12, 14 are arranged to the bottom plate 10 forming side surfaces 12', 14' and a rear wall 16 with its surface 16'. The front part 20 is substantially open and provided with a suitable device, for example a welded flange 21 for connection with, for example, the combustion chamber of a furnace. The side walls 12, 14 and the rear wall 16 are interconnected with an upper wall 22, which upper wall 22 is arranged with a passage 24. The side walls 12, 14, the rear wall 16 and the upper wall 22, form a space 26. Above the upper wall 22, a silo or the like container for the solid fuel (not shown), is arranged and connected to the passage 24.

The space 26 is provided with a pusher means 30, comprising a number of pusher rods 32 with a circular cross section, running through the rear wall 16 and parallel with the side walls 12, 14 and parallel, and with a distance above, the bottom plate 10. The passages for the pusher rods 32 through the rear wall are sealed with suitable packing boxes 34.

The pusher means 30 also comprises a yoke 36 arranged outside the space 26, to which yoke 36 the pusher rods 32 are detachably attached perpendicular to said yoke 36. The feeding apparatus 8 is also equipped with drive means 38 in the form of a number of hydraulic cylinders 40, two in the preferred embodiment, the pistons 42 of which are attached to the yoke 36 and arranged parallel with the pusher rods 32. In the shown embodiment the hydraulic cylinders 40 are placed outside the side walls 12, 14 of the space.

The bottom plate 10 is preferably provided with some sort of guide, for example a transversal profile 44 with recesses for the pusher rods 39 so that they can slide back and forth.

The function is as follows. The space is filled with the solid fuel from the storage space above (not shown) in the opening 24. The hydraulic cylinders 40 are activated so that their pistons 42 obtain a reciprocating movement. Because the pistons 42 are attached to the yoke 36 and the pusher rods 32 in their turn are attached to the yoke 36, they will also obtain a reciprocating movement. The dotted parts in FIG. 1 show the pusher rods 32 and the yoke in their rear most position. The ends of the pusher rods 32 that are inside the space 26 will thus push material against the opening 20 during the forward movement. The pusher rods 32 preferably have different lengths and are adapted so that certain of the rods 32, when they are in their foremost position, i. e. closest to the opening 20, have their ends substantially in plane with the opening, and, when they are in their rearmost position, have their ends substantially in plane with the rear wall 16. The reciprocating movement of the pusher rods 32 will ensure that material continuously will be pushed to and through the opening 20 at the same time as the design of the apparatus with rods ensure that no material can be drawn back against the rear wall 16 during the return movement. Due to the fact that a certain number of the rods 32 have such a length that their ends, when they are in their rearmost position, are substantially in plane with the rear wall 16, this ensures that material will not be stuck there. When material is continuously fed through the opening 20, new material will continuously fall down through the upper opening 24 and refill the space 26.

The pusher rods 32, their passages with the packing boxes 34 and connection to the yoke 38, have a stabilising effect so that, in most cases, no further guiding of the yoke 38 is necessary.

Due to the continuous supply of material and the sealing with packing boxes 34 around the passage of the circular pusher rods 32 in the rear wall 16, it is ensured that no air can be sucked in from this direction and cause ignition of the material in the space 26.

Figure 3:
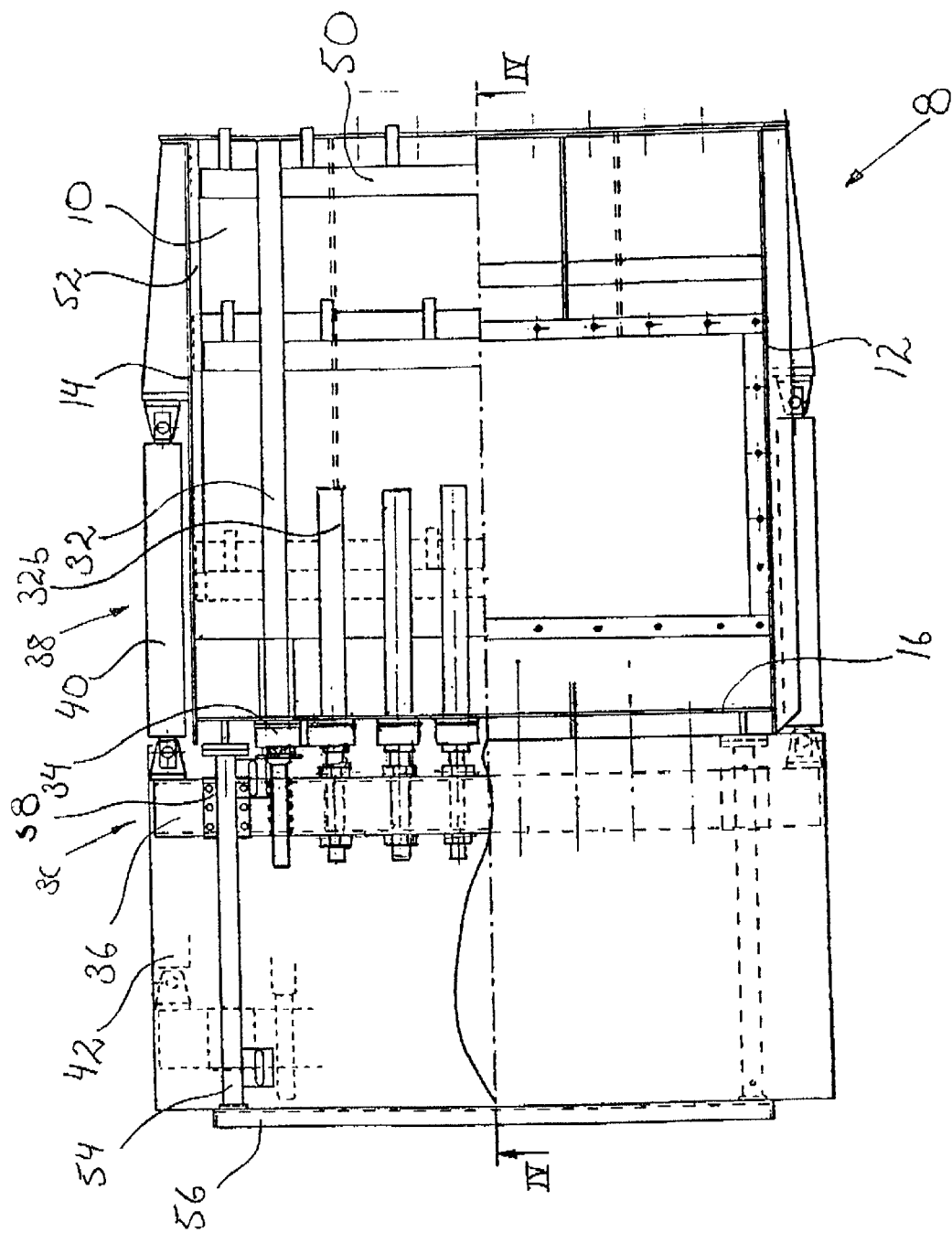
Figure 4:
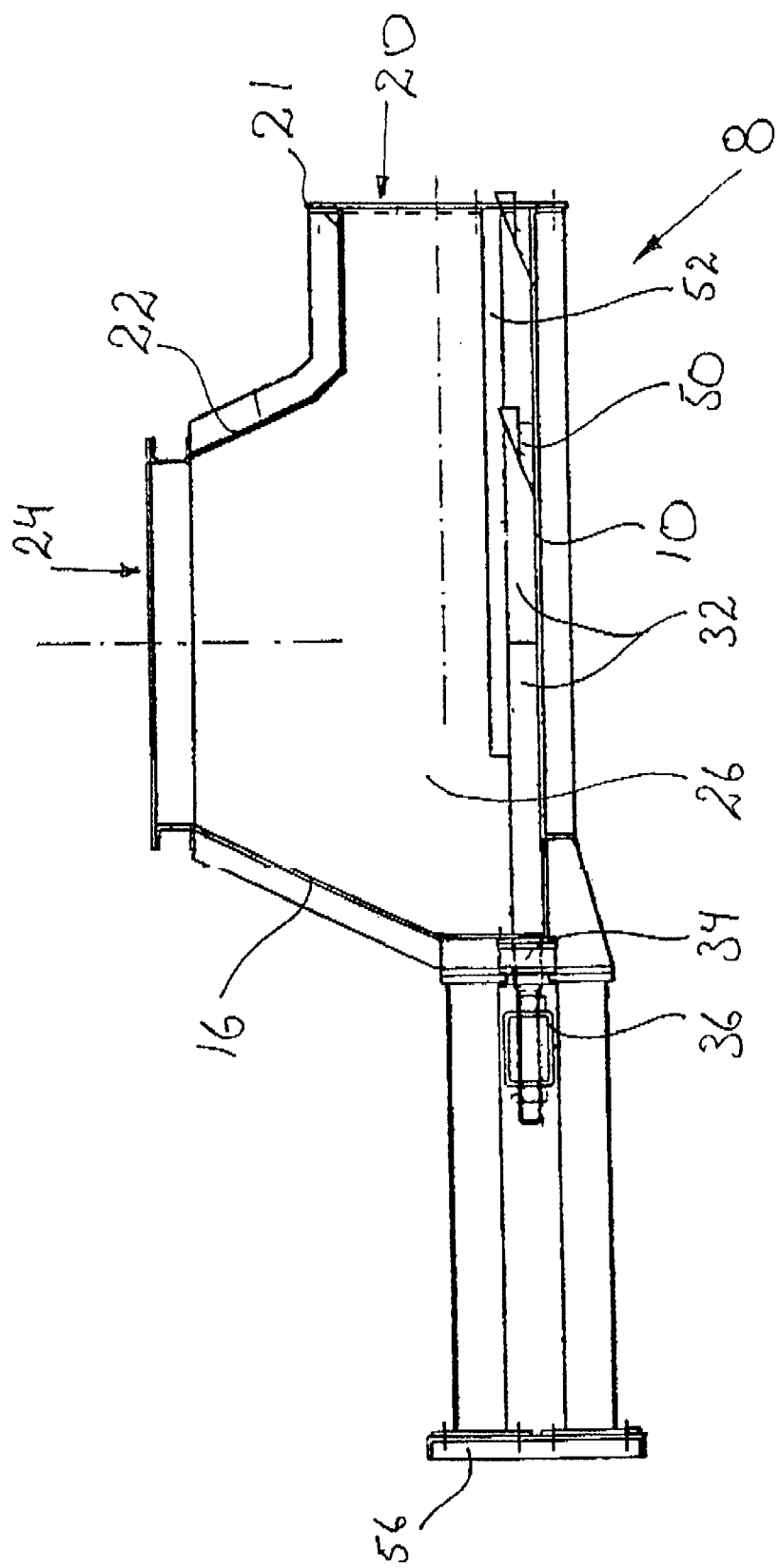

FIGS. 3 and 4 show another embodiment of the apparatus according to the present invention. The same details as in FIGS. 1 and 2 have the same reference numerals in these figures. In this embodiment, a conventional feeding apparatus has been modified with the above mentioned pusher rods. On the bottom plate 10, a number of pusher knives 50 are arranged with a distance between each other, which knives 50 extend between the both side walls 12, 14. The side walls 12, 14 are arranged with guiding devices 52 in the form of ledges or linear guides fixedly secured to the side walls and parallel, and with a distance above, the bottom plate 10. The pusher knives 50 are fixedly secured to a number of pusher rods 32, in the preferred embodiment two, with the above mentioned design. The pusher rods 32 are attached perpendicular to the pusher knives 50. The pusher rods 32 run trough the rear wall 16 and are attached to the yoke 36 as described above. In the same manner as above, also the drive means 38 is attached to the yoke 36. The passages of the pusher rods 32 are sealed with suitable packing boxes 34. A number of guides 54 in the form of shafts with a circular cross section, in the preferred embodiment two, are fixedly attached to the rear wall 16 and directed rearwards and parallel with the pusher rods 32.

The rear ends of the guide rods 54 are interconnected with a transversal spacer device 56. The yoke 36 is slidably arranged to the guide rods 54 via journal bearings 58. A number of pusher rods 32b are also attached to the yoke 36 with the same form as the above mentioned pusher rods 32, which rods 32b extend through the rear wall 16 and extend a distance into the space 28. The passages of the pusher rods 32b in the rear wall 16 are sealed with packing boxes 34 in the same manner as for the pusher rods 32.

The function of this embodiment is similar to the one described for the embodiment according to FIGS. 1 and 2 but with the difference that the knifelike pushers 50 perform the main feeding of material to and through the opening 20, while the shorter pusher rods 32b, which lie substantially in the same plane as the rear wall when they are in their rearmost position, ensure that material cannot be packed against the rear wall 16 during the return movement of the pusher means 30. The dotted parts in FIG. 3 show the pusher rods 32 and the yoke 36 when they are in their rearmost position.

It shall be understood that the apparatus according to the invention is not limited to the embodiments described above and shown on the drawings, but may be modified within the scope of protection of the patent claims. Thus, it contemplated that the pusher rods 32 have more different lengths depending on the length of the space 26, in order to obtain a continuous feeding of material. Also, the hydraulic cylinders 40 may be arranged to the yoke 36 in a variety of ways in order to obtain the reciprocating movement depending on access to space and application. The design of the yoke 36 and possible guides for this may be done in a number of ways and are not important to the design and function of the apparatus.

The main issues of the present invention is to provide an apparatus which effectively can feed solid material such as wood chips, bark, peat, coal and the like without the material being packed in the apparatus, and that air is prevented from entering, and naturally material from exiting, from unwanted places in the apparatus.

I claim:

1. Apparatus for feeding of solid material, preferably solid fuels in a space (26) limited by a substantially plane bottom plate (10) forming a bottom surface (10'), around the bottom surface (10') arranged side walls (12, 14, 16) forming limiting surfaces (12', 14', 16') and an opening (20) in said space (26), the lower edge of said opening (20) lying in substantially the same plane as said bottom surface (10'), transporting means (30) arranged adjacent to said bottom surface (10'), which transporting means (30) extend through the limiting surface (16') opposite the opening (20), and drive means (38) arranged outside said limiting surfaces (12', 14', 16') and attached to said transporting means (30) in order to obtain a reciprocating movement of said transporting means (30) in a direction to and from said opening (20), characterized in that said transporting means (30) comprises a number of transporting rods (32) arranged substantially parallel with each other and substantially parallel with said bottom surface (10') and that the ends of the pusher rods during the reciprocating movement are located within the bottom surface, whereby the ends of the pusher rods will push the solid matter in the feeding direction during the forward movement.

2. Apparatus according to claim 1, characterized in that said transporting rods (32) have a circular cross section.

3. Apparatus according to claim 1, characterized in that said transporting rods (32) are sealed against said limiting surface (16').

4. Apparatus according to claim 1, characterized in that said transporting rods (32) extend with different lengths in the space (26).

5. Apparatus according to claim 1, characterized in that at least one of said transporting rods (32) have such a length that its front end lies substantially in plane with said limiting surface (16') when the drive means (38) have moved the transporting rods (32) to their rearmost position.

6. Apparatus according to claim 1, characterized in that said bottom surface (10') is arranged with a support and guide means (44) for said transporting rods (32).

7. Apparatus according to claim 1, characterized in that the transporting means (30) further comprises transporting knives (50), which transporting knives (50) are arranged perpendicular to said transporting rods (32) and attached to at least two of said transporting rods (32).

8. Apparatus according to claim 7, characterized in that the transporting means (30) is further arranged with at least one of said transporting rods (32), which transporting rod (32) has such a length that its front end lies substantially in plane with said limiting surface (16') when the drive means (38) have moved the transporting rods (32) to their rearmost position.

\* \* \* \* \*